March 17, 1959 W. A. FONKEN 2,877,815
CANTING HOLDDOWN CLAMP
Filed May 23, 1955 2 Sheets-Sheet 1
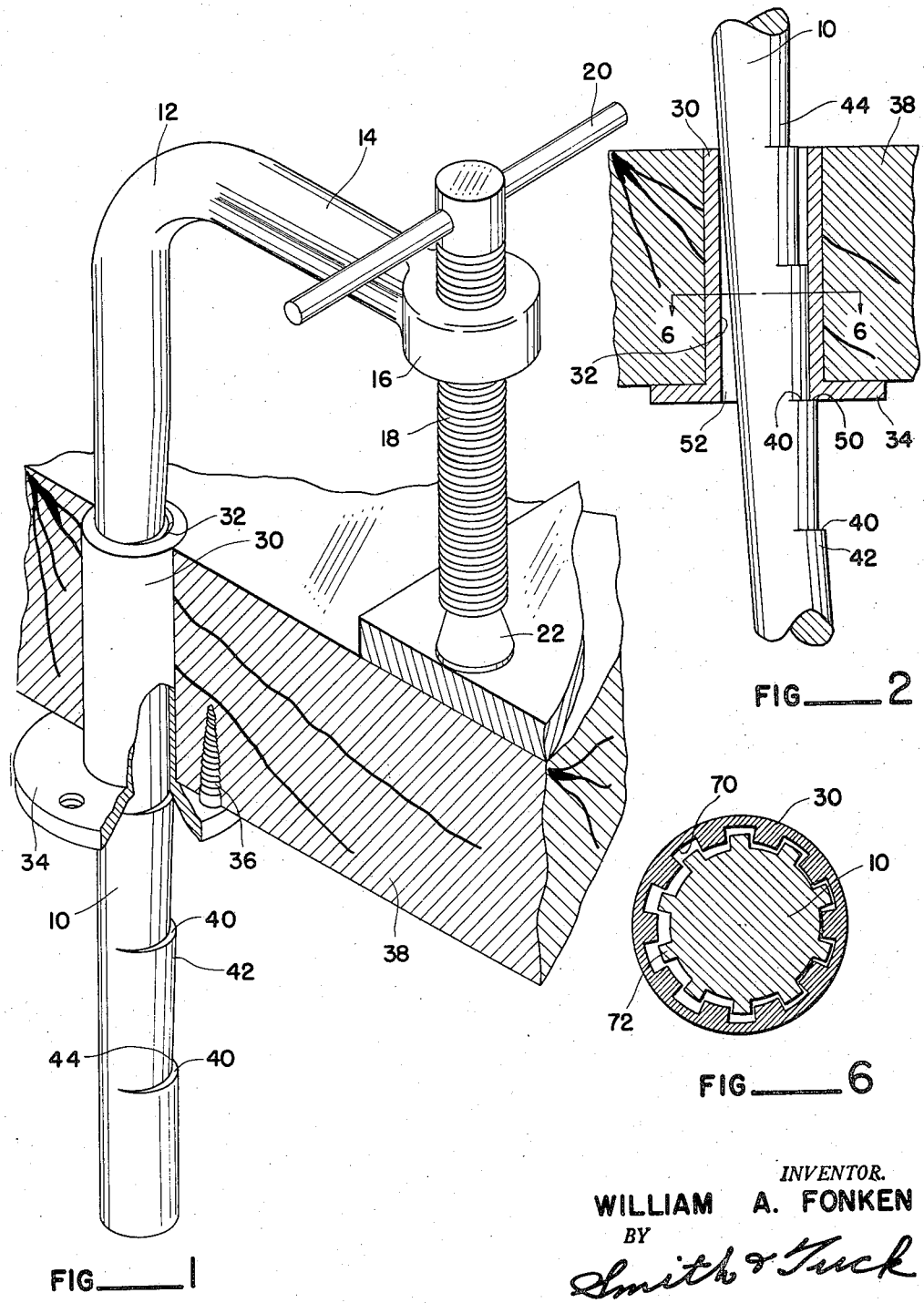
INVENTOR.
WILLIAM A. FONKEN
BY
Smith & Tuck March 17, 1959  W. A. FONKEN  2,877,815
CANTING HOLDDOWN CLAMP Filed May 23, 1955  2 Sheets-Sheet 2

*INVENTOR.*
WILLIAM A. FONKEN
BY
Smith & Tuck

United States Patent Office 2,877,815
Patented Mar. 17, 1959

2,877,815

CANTING HOLDDOWN CLAMP

William A. Fonken, Seattle, Wash., assignor to Hold Corporation, Seattle, Wash., a corporation of Washington Application May 23, 1955, Serial No. 510,354

2 Claims. (Cl. 144—290)

This present invention relates to the general class of clamping devices which are employed by woodworkers, machinists, hobbyists, and the like, to hold materials in place on a worktable. More especially this invention relates to clamp means which are so arranged that they lend themselves especially to the clamping of materials on table tops of considerable expanse, and under conditions where the usual screw clamp or C-type clamps could not be directly employed. The clamping means consists essentially of a configured shaft which terminates in a substantially right angle bend and in the end of the bend portion a clamping screw of more-or-less conventional type is disposed for adjustable positioning. The main shaft of the clamp means is adapted to co-operatively engage, preferably, metal bushings which are placed at various points through the surface of the worktable to the end that irregular members may be easily clamped on relatively wide table surfaces. The device is also adaptable for use on machine tools employed in the machining of metals as well as wood and the like.

Workmen who work on wooden, plastic and metal items have found it difficult to clamp their work pieces securely to a fixed table. This is particularly true where irregular pieces are being worked upon. In the past there has been readily available various types of screw clamps in which two parallel jaws are advanced toward each other by, normally, two parallel screws. There has been available a wide range of C clamps and various other clamp means have been provided, such as clamps that are mounted upon a bar or tube so that the clamping means can be adjustably positioned thereon. None of these clamp means, however, serve to hold large items on a table top, such as may confront the pattern maker, the hobbyists, or other craftsmen who may work on a variety of items. Many of these people work on metals, wood and plastic materials either with hand cutting tools or power cutting tools and it is very essential that the work pieces be easily held against the pressure of the tools during the various working operations. These various clamps, as noted, are normally only useful for clamping relatively regular pieces of material at the edge of a table, due to the fact that it is difficult to provide a clamp with a sufficiently long over-reach or throating. This same deficiency in the present clamping equipment is particularly to be noted in power metal working machines, such as drill presses, milling machines, shapers, and the like. In this present invention means are provided for clamping work to a table without any regard to the margins of the table. Workers in this general field have, in the past, become accustomed to spending considerable time contriving, for each individual job, clamping bars or beams which are designed to engage the work and to then extend to the margins of the table so that clamps of the conventional types can then be applied to the ends of the beam and in turn put pressure on the work. This is a very time consuming and unsatisfactory arrangement.

With this present invention it is only necessary that a number of bushings be inserted in the table top or on stanchions or on machine tools, and then the clamping units can be very quickly inserted in these bushings and as soon as clamping pressure is applied, the shank of the clamp means becomes locked in the bushing and thus a very convenient and time-saving means is provided for having a clamp which can take adequate pressure at any desired point on a working surface. It is therefore believed that a very worthwhile improvement has been made in clamping means for these specific purposes, as indicated, and which no doubt will be very useful in many fields of endeavor.

The principal object of this present invention, therefore is to provide a clamping means which can be conveniently, firmly and quickly applied at any point in the surface used to support work pieces.

A further object of this invention is to provide screw clamping means having a shank portion adapted to co-act with a metal bushing, previously set in place, to the end that the full clamping strain that can be applied by the screw can be applied without any slippage of any kind.

A further object of this invention is to provide a light weight, inexpensive clamp means which can be easily applied to the margins of irregular work pieces and hold said work pieces accurately in position against the action of hand tools or machine tools applied to the work.

A further object of this invention is to provide a clamping means with a configured shank adapted to engage a pre-set bushing in a free entry manner, and which will remain easily adjustable for height or angular position until clamping pressure is applied by the clamp screw, at which time the unit becomes fixedly positioned.

Further objects, advantages and capabilities will be apparent from the description and disclosure in the drawings, or may be comprehended or are inherent in the device.

In the drawings:

Figure 1 is a perspective view, partly in section, illustrating a preferred arrangement of my clamping means and in the manner in which it is installed and used;

Figure 2 is a fragmentary elevation, partly in section, taken through the diameter of the table top bushing employed with my device;

Figure 6 is a cross-sectional view as though taken on a horizontal plane through Figure 2, but illustrating an additional form of configuration of the clamp shank and of the bore of the bushing.

Figure 3:
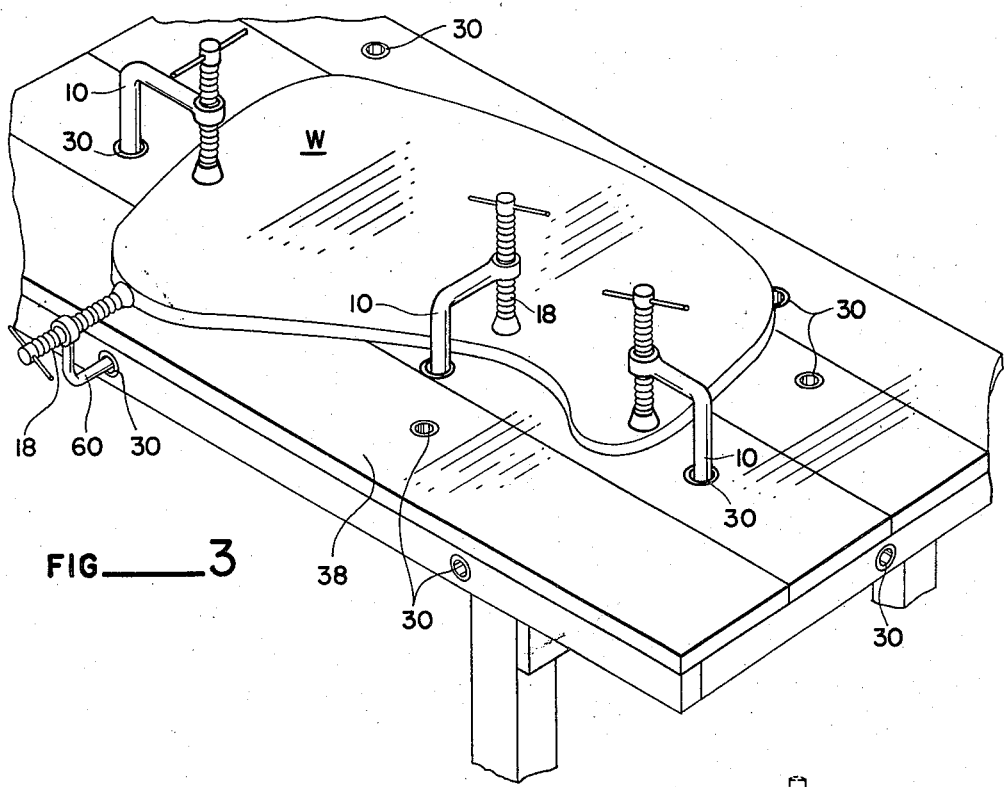
Figure 3 is a perspective view illustrating one of the numerous ways of employing my clamping means to hold a large work piece on an extended table top.

Referring more particularly to the disclosure in the drawings, the numeral 10 designates the shank or principle shaft-like portion of a preferred form of my clamp means. This shank extends upwardly, normally, to a bend portion 12 and from this point an arm 14 extends laterally. Arm 14 terminates in a boss 16, which is threaded to operatively engage the clamp screw 18. Screw 18 may have any convenient means for turning the same as the through bar 20, and at its lower end is provided with some acceptable form of foot arrangement, as the swiveling foot indicated at 22. It is desirable to point out that the proportions of these various parts may vary through a wide range in order to adapt this present plan to the wide range of operational conditions met with in the wood and metal working crafts. For certain uses the arm portion 14 may be very appreciably extended in order that a greater over-reach be provided. Similarly, there is no practical limit to the length of the shank portion 10, however, the convenience of use does have a marked influence on the exact proportioning and sizes of this equipment as naturally it follows that the smaller and lighter the equipment, the more easily and the quicker it can be handled.

In use the shank 10 passes through a, preferably, metal bushing 30. This bushing is provided with a bore 32, which is generously over-sized for shank 10 so that the same can be passed quickly up or down through the opening, and further, may easily be given a slight rocking motion within bore 32 that is essential for the locking of shank 10 after the teachings of this invention. In use considerable upward thrust is imparted to bushing 30, consequently it has been found desirable to provide it with a retaining flange, as 34, which is preferably screw-fastened as by a plurality of screws 36, to the underside of the work bench top 38. The angularity of the shank 10 with respect to the axis of bushing 30 indicates the desirability of having bend 12 less than a right angle in order that screw 18 will be applied to the work at right angles to the table top.

It is to be noted particularly by reference to Figures 1 and 2 that on the side of shank 10, which lies directly under arm 14, that I provide a plurality of spaced-apart shoulders, as 40. These shoulders are formed by cutting away the metal in a gradual taper between the shoulders starting at zero, cut at 42, and with the maximum cut at 44. This tapering normally only extends around one half of shank 10, and of course need not extend that far if a lesser engagement of shoulder 40 is acceptable for the work expected of the clamp means.

Referring to Figure 2, it is to be noted that shoulder 40 engages under bushing 10, circumferentially engaging the under surface of the bushing or its component flange 34. In Figure 2 the shank is shown in its normal clamping position and as the diameter of the shank just below the top surface of the step portion 40 is full diameter, as it has not been machined at that point, the amount of engagement effected at 50 is added to the normal clearance between the unmachined diameter of shank 10 and bore 32, so that an appreciable amount of clearance is provided at 52.

In Figure 3 I have illustrated one of the conditions under which my clamp means has proven to be particularly advantageous. In this it may be assumed that a work table 38 is provided of very appreciable width, and that a plurality of bushings 30 are disposed throughout the surface. A rather large work piece W is shown as resting upon the table and held in place by a plurality of clamp members. The shanks of these members pass through any convenient bushings and then screws 18 are tightened, after the showing of Figures 1 and 2. In many instances where there is a tendency to shift the work sideways on the table, it may be desirable to employ a number of my clamp units anchored in the edge of the table, as is illustrated at 60, or to the table supporting legs. The shank and clamp screw assembly may be identical as used in a vertical arrangement and one or more of these units may be employed to hold the work W against movement as might occur on the chipping of a casting with hand or powered chisels.

Figure 4:
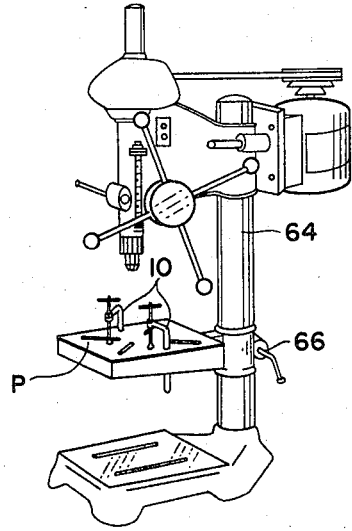
Figure 4 illustrates the application of my clamp means to the work table of a drill press.
Figure 5:
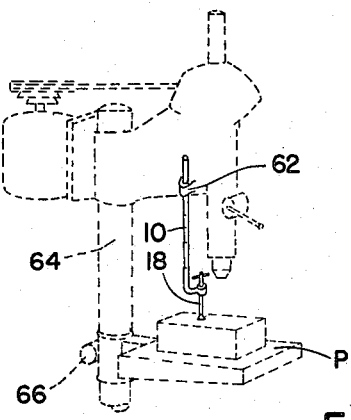
Figure 5 illustrates the employment of my clamp means as applied to the head of a drill press and adapted to place pressure on the work table thereof.

Throughout the drawings I have endeavored to illustrate one useful form of my clamp means. It will be apparent, it is believed, that many variant structural forms of this device might be employed for different specific uses. In Figure 4 I have illustrated two of my clamp units as being employed on the platen P of a conventional bench drill press. In Figure 5 a further variation of this structure is illustrated in which the clamp screw 18 is reversed in boss 16, and an equivalent of bushing 30 is provided in a special boss 62, formed as part of or fixedly secured to the head of the drill press. This boss, after the teachings of bushing 30, would need only a straight bore, slightly over-sized, beyond the diameter of shank 10, which would have the same general type of shoulders or ledges 40, as is probably best illustrated in Figures 1 and 2. With such an arrangement, platen P of the drill press is vertically adjusted upon post 64 and clamped in position by the usual component clamp means 66, then shank 18 would be appropriately positioned in boss 62 so that screw 18 would have ample threaded latitude to suitably engage and clamp a piece of work to be undertaken by the drill press. It will be clear, it is believed, that on a small drill press this device would be merely a substitute for the usual C clamp. However, if the more conventional form of platen, such as are used commercially, which on a press of this order might be eighteen inches wide and three feet long, then my clamp means would be employed to much greater advantage and in a manner which could not be served by the usual C clamps in more common use.

For certain uses it may be desirable to provide additional means to prevent the partial rotation of shank 10. Experience has indicated that as part of the shank is machined away to provide the tapering surfaces terminating in ledges 40, that a different radius is produced on the portion machined and this tends to lock shank 10 against rotation. This, together with the wedging action caused by power applied to screw 18 is normally sufficient. It is desirable to point out, however, that in extreme circumstances it is a relatively simple matter to broach splining, as 70, in bushing 30 and to cut splines, as 72, on the exterior of shank 10. This would very effectively prevent any rotation of the shank with respect to bushing 30 and does not interfere with the formation of shoulders 40 as the same machine operations would be executed on the spline shaft as are now required to produce the stepped shank 10, as illustrated. It is readily apparent that other means might be employed to insure the locking of shank 10 and bushing 30 against rotation, however, it is believed that the showing of Figure 6 may be taken as representative of such means.

It is believed that it will be clearly apparent from the above description and the disclosure in the drawings that the invention comprehends a novel construction of a clamping means for use on tables.

Having thus described my invention, I claim:

1. Table clamp means, comprising: a table having a plurality of bushings with cylindrical bores of uniform diameter throughout their lengths, said bores being oriented substantially in the direction it is desired to apply force, said bushings being provided, at their bottoms, with a peripheral flange disposed at right angles to the axis of the bushing, a plurality of round clamping shanks of a diameter appreciably less than the bore of said bushings fitting in said bushings, each having at one end a lateral arm which has a clamp screw at its end oriented substantially parallel to its shank and the clamp screw having a pressure foot adapted to apply pressure on a work piece, each shank having a plurality of notches, having a length greater than the diameter of the shank, spaced longitudinally therein; said bushings each having an abutment adapted to engage one of said notches at a time in a direction preventing withdrawal of the associated shank under the force of the clamp screw when the shank has been tilted relative the bushing by said force, the angle of tilt of each shank is substantially the same as the angle at which the longitudinal wall of each notch extends with respect to the axis of the shank, whereby a full length contact of said longitudinal wall with the interior wall of the bushing is provided during clamping operations.

2. A canting holddown clamp to fit on a table or the like, comprising: a bushing having a splined bore of uniform cross section, throughout its length, oriented substantially in the direction it is desired to apply force; a clamping shank, adapted to coact with said bushing, having at one end a lateral arm, which has a clamp screw at its end oriented substantially parallel to said shank and the clamp screw having a pressure foot adapted to apply pressure on a work piece; said shank having a plurality of notches, disposed longitudinally thereof and on the side opposite from said lateral arm, adapted to engage an end of said bushing in a direction preventing withdrawal of said shank under the force of the clamp screw when the shank has been tilted relative to the bushing by said force, the angle of tilt of said shank being substantially the same as the angle at which the longitudinal wall of each notch extends with respect to the axis of the shank, whereby a full length contact of said longitudinal wall with the interior wall of the bushing is provided during clamping operations, and said shank having interengaging spline means preventing relative rotary movement between said shank and said bushing, after the shank has been inserted in the bore of said bushing.

References Cited in the file of this patent

UNITED STATES PATENTS

| | | |
|---|---|---|
| 142,697 | Holmes | Sept. 9, 1873 |
| 457,363 | Morrill | Aug. 11, 1891 |
| 1,954,708 | Mass | Apr. 10, 1934 |
| 2,147,800 | Sadowski | Feb. 21, 1939 |
| 2,603,325 | Pickard | July 15, 1952 |

FOREIGN PATENTS

| | | |
|---|---|---|
| 278,666 | Germany | Oct. 2, 1914 |
| 547,992 | Great Britain | Sept. 21, 1942 |